United States Patent
Troise et al.

(10) Patent No.: US 9,849,608 B2
(45) Date of Patent: Dec. 26, 2017

(54) POLYMER "CANE" EXTRUDER

(71) Applicants: Karen Troise, Richmond Hill, GA (US); Anthony M. Troise, Richmond Hill, GA (US)

(72) Inventors: Karen Troise, Richmond Hill, GA (US); Anthony M. Troise, Richmond Hill, GA (US)

(73) Assignee: Karen Troise, Richmond Hill, GA (US)

(*) Notice: Subject to any disclaimer, the term of this patent is extended or adjusted under 35 U.S.C. 154(b) by 64 days.

(21) Appl. No.: 14/845,363

(22) Filed: Sep. 4, 2015

(65) Prior Publication Data
US 2017/0066156 A1    Mar. 9, 2017

(51) Int. Cl.
| | |
|---|---|
| B28B 3/26 | (2006.01) |
| B28B 17/00 | (2006.01) |
| B29C 47/00 | (2006.01) |
| B29C 47/54 | (2006.01) |
| B29C 47/66 | (2006.01) |
| B44C 1/00 | (2006.01) |
| B30B 11/26 | (2006.01) |

(52) U.S. Cl.
CPC ............ *B28B 3/26* (2013.01); *B28B 17/0036* (2013.01); *B29C 47/0002* (2013.01); *B29C 47/54* (2013.01); *B29C 47/66* (2013.01); *B44C 1/00* (2013.01); *B29C 47/0004* (2013.01); *B29C 47/0016* (2013.01); *B29C 47/0066* (2013.01); *B30B 11/26* (2013.01)

(58) Field of Classification Search
CPC ................................ B28B 17/0036; B28B 3/26
USPC ................... 425/113, 197, 289, 182; 83/652; 264/176.1, 210.1
See application file for complete search history.

(56) References Cited

U.S. PATENT DOCUMENTS

| | | | | |
|---|---|---|---|---|
| 1,368,363 | A | * 2/1921 | Simmons | ................... C14B 5/02 30/316 |
| 1,370,800 | A | * 3/1921 | Egerton | ................... B29C 47/54 264/150 |
| 1,418,317 | A | * 6/1922 | Madson | ................... C14B 5/02 12/31.5 |
| 2,573,050 | A | * 10/1951 | Orsini | ................... B29C 47/0066 264/173.17 |
| 3,217,579 | A | * 11/1965 | Rubico | ................... A43D 27/00 83/652 |

(Continued)

*Primary Examiner* — Nahida Sultana

(57) ABSTRACT

A polymer "cane" extruder is a hand held polymer clay extruder tool made to extrude polymer clay canes with ease. It is designed for home use and comprises of a solid rod and a hollow tube that is made of clear acrylic with marked guidelines. It is an extruder tool that not only extrudes clay but is mainly used for cutting polymer clay cane slices of various uniform and consistent shapes, which includes cylindrical, square, and triangular shapes. This tool aids in holding the polymer canes unique shape and size when compressed and extruded while maintaining the shape of the pieces of polymer cane that are to be sliced off without distorting their original shape. A polymer clay "cane" extruder is very useful for making multi-patterned "sheets" from pieces of polymer clay canes that are combined into one continuous piece. These sheets are used in jewelry articles, such as beads, pendants, bracelets, and neckpieces and/or other arts and crafts related projects.

5 Claims, 5 Drawing Sheets

(56) References Cited

U.S. PATENT DOCUMENTS

| | | | | |
|---|---|---|---|---|
| 3,280,847 | A * | 10/1966 | Chisholm | B29C 47/14 138/121 |
| 3,461,490 | A * | 8/1969 | Cottingham | B29C 47/0004 264/171.24 |
| 3,469,488 | A * | 9/1969 | Gaspari | B26F 1/405 83/652 |
| 3,604,597 | A * | 9/1971 | Pohl | B29B 13/022 219/230 |
| 3,688,325 | A * | 9/1972 | Panter | A43D 8/06 12/52.5 |
| 3,750,905 | A * | 8/1973 | Wolfrom | B05C 17/0053 219/230 |
| 3,953,006 | A * | 4/1976 | Patarcity | B05C 17/00553 366/100 |
| 3,954,206 | A * | 5/1976 | Salonen | B05C 17/00533 219/421 |
| 3,979,488 | A * | 9/1976 | Greenhalgh | B29C 47/0004 264/171.15 |
| 4,266,919 | A * | 5/1981 | Dunnington | B29C 47/54 264/126 |
| 4,797,242 | A * | 1/1989 | Fukuda | B29C 47/0004 264/108 |
| 4,825,740 | A * | 5/1989 | Mucci, Sr. | B26F 1/44 76/107.8 |
| 4,842,788 | A * | 6/1989 | Johnson | B29C 47/38 264/211.23 |
| 4,885,822 | A * | 12/1989 | Corrie | A22C 11/06 425/579 |
| 5,549,859 | A * | 8/1996 | Andersen | B01F 3/1214 264/102 |
| 5,656,220 | A * | 8/1997 | Whittemore | B01D 29/111 264/43 |
| 6,500,374 | B1 * | 12/2002 | Akioka | B22F 3/20 264/148 |
| 2003/0000354 | A1 * | 1/2003 | Workman | B26F 1/44 83/13 |
| 2003/0203993 | A1 * | 10/2003 | Katsumura | B29B 7/905 523/351 |
| 2010/0136269 | A1 * | 6/2010 | Andersen | B28B 1/52 428/34.4 |
| 2011/0027403 | A1 * | 2/2011 | Carlson | A23P 1/12 425/113 |
| 2014/0371050 | A1 * | 12/2014 | Crawford | B28B 1/50 501/1 |
| 2015/0190942 | A1 * | 7/2015 | Smith | B26F 1/44 29/505 |
| 2016/0346997 | A1 * | 12/2016 | Lewis | B29C 67/0055 |

* cited by examiner

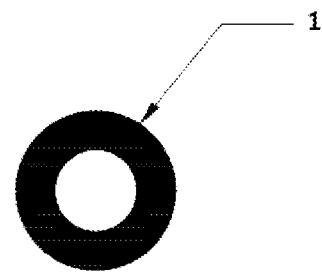
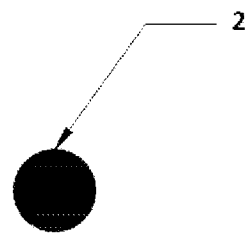
FIG. 1  FIG. 2
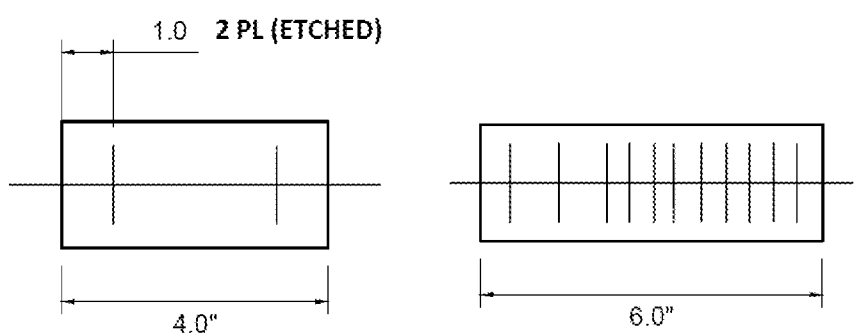
FIG. 3

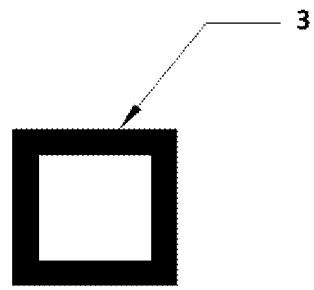
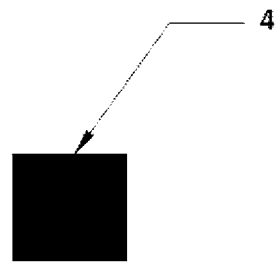
FIG. 4  FIG. 5
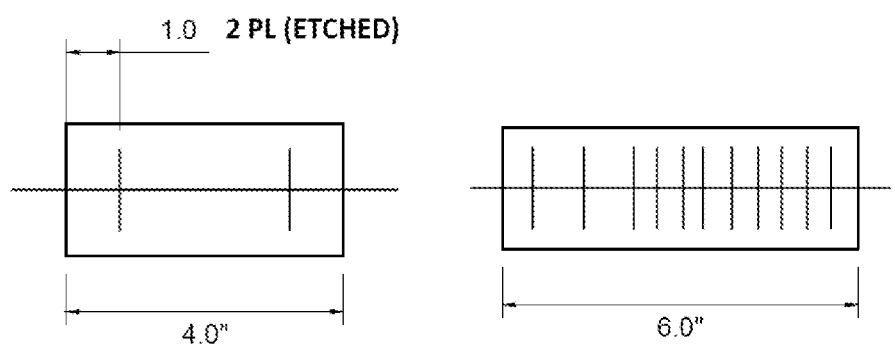
FIG. 6

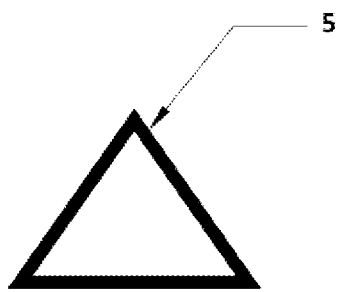
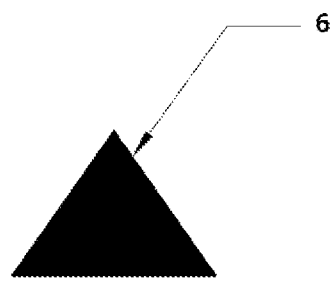
FIG. 7  FIG. 8
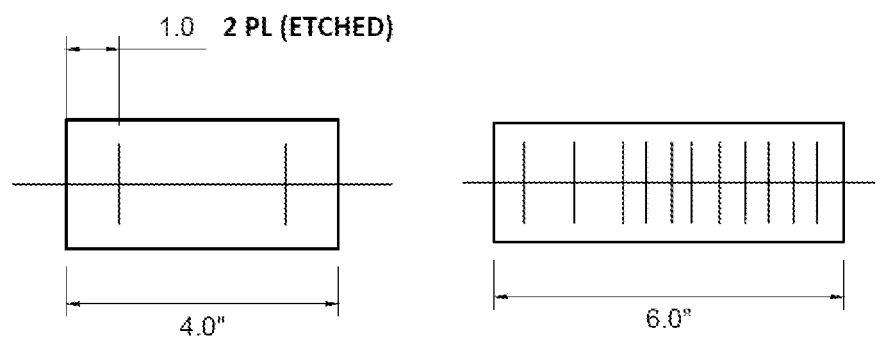
FIG. 9

POLYMER "CANE" EXTRUDER

CROSS REFERENCE TO RELATED APPLICATIONS

Not applicable

FEDERALLY SPONSORED RESEARCH AND DEVELOPMENT

Not applicable.

MICROFICHE

Not applicable

BACKGROUND OF THE INVENTION

Field of the Invention

The present invention relates to a hand held polymer clay extruder tool used a to cut polymer clay cane slices of various uniform and consistent shapes and sizes and a method of producing patterned polymer clay cane sheets.

Background of the Invention

Polymer clay techniques have been widely used in art and craftsmanship for several years. As its name implies, polymer clay is a pliable and blend-able polymer compound. It is not true clay, as clay is fine silicate particles suspended in water, whereas polymer clay is fine polyvinyl chloride—PVC suspended in plasticizer. However, polymer clay can be used much like clay.

Polymer clay is versatile. It can be blended with dozens of colors, such as paints, to make the desired colors. Since the color is inherent in the particles, the artists or crafters can also work two or more colors together, without blending them, for special effects, such as cane working and marbling. The clay's pliability and ductility allow artists or crafters to use techniques from glasswork, textile arts, and sculpture. Furthermore, polymer clay doesn't dry out, so they can sculpt and form it without worrying about a time limit.

Artists or crafters can cover anything as long as it won't melt or burn at the low firing temperature with a veneer of polymer clay: wooden boxes, picture frames, mirrors, and tableware. One popular application is jewelry. Polymer clay can be used to make beads, pendants, bracelets, and neckpieces. Small sculptures and buttons are other possibilities. Clay artists have developed techniques to give polymer clay the appearance of granite, jade, amber, coral, turquoise, and ivory. Its flexibility means that they can make pieces in shapes and sizes that wouldn't be possible with actual stone.

Polymer clay is a fantastic medium to use when making jewelry, and a great hobby for all ages. It is a man made, non-toxic craft material that is made of tiny particles of PVC—poly vinyl chloride, pigments, and a liquid plasticizer. Forming polymer clay jewelry has become a very popular craft or art form. Typically, jewelry and other items are formed by hand, sometimes employing conventional extruders that are very hard on the hands and wrists due to the force required for extruding the clay through a die to create shapes. These conventional extruders don't address the cutting of pre-shaped canes—an intricate combination of clay usually made into a log of varying shapes—into a plurality of uniform pieces while maintaining the integrity and shape of the original cane when cutting off slices.

The present invention addresses the above described use of polymer clay for making jewelry and other arts and crafts articles by providing a tool such as a hand held extruder and method of producing patterned sheets of polymer clay that is needed by polymer clay artists for the purpose. As such, it may be appreciated that there continues to be a need for a new and improved clay extruder tool, as set forth by the present invention, which addresses the problems of ease of use as well as effectiveness in construction in providing the useful tool for polymer clay artists. In this respect, the present invention substantially fulfills this need.

SUMMARY OF THE INVENTION

In view of the foregoing disadvantages inherent in the known types of the polymer clay extruders now present in the prior art, the present invention provides a clay extruder tool for cutting uniform slices of polymer clay canes and a method of producing patterned polymer clay cane sheets. As such, the general purpose of the present invention, which will be described subsequently in greater detail, is to provide a new and improved polymer clay extruder that has advantages of the prior art, and none of the disadvantages.

Accordingly, it is a primary objective of the present invention to provide a tool for aiding in the cutting of polymer clay slices of various uniform and consistent shapes.

In another aspect, the present invention provides a tool made from clear acrylic in various shapes.

It is yet another aspect of the present invention where the tool makes it possible to extrude and cut uniform plurality of pieces of polymer canes with ease.

It is another objective of the present invention to provide a method for producing patterned polymer clay cane sheets from the cut polymer canes that can be used to make jewelry or other items.

Additionally, it is another objective of the present invention to assist in the cutting of uniform slices of cane with little to no distortion of the original cane and with very little waste.

In further aspect, the tool is specifically designed for polymer clay artists or novices, and can be used at home.

It is still another objective of the present invention to provide a new and improved polymer clay extruder tool that may be easily and efficiently manufactured and marketed.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objectives of the invention, along with the various features of novelty which characterize the invention, are pointed out with particularity in the disclosure. For a better understanding of the invention, its operating advantages and the specific objectives attained by its uses, reference should be made to the accompanying drawings and descriptive matter in which there are illustrated preferred embodiments of the invention.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

BRIEF DESCRIPTION OF THE DRAWINGS

The invention will be better understood and objectives other than those set forth above will become apparent when consideration is given to the following detailed description thereof. Such description makes reference to the annexed drawings wherein:

FIG. 1 illustrates the partial prospective top view of a polymer cane extruder tube in the invention with a circular head.

FIG. 2 illustrates the partial prospective top view of polymer cane extruder rod in the invention with a circular head.

FIG. 3 illustrates the prospective view of measurements of the hollow tube and rod of a polymer cane extruder in the invention in circular shape.

FIG. 4 illustrates the partial prospective top view of a polymer cane extruder tube in the invention with a square head.

FIG. 5 illustrates the partial prospective top view of a square polymer cane extruder rod in the invention with a square head.

FIG. 6 illustrates the prospective view of measurements of hollow tube and rod of a polymer cane extruder in the invention with a square head.

FIG. 7 illustrates the partial prospective top view of tube of a polymer cane extruder in the invention with a triangular head.

FIG. 8 illustrates the partial prospective top view of a triangular polymer cane extruder in the invention with a triangular head.

FIG. 9 illustrates the prospective view of measurements of hollow tube and rod of a polymer cane extruder in the invention in triangular shape.

Figure 11:
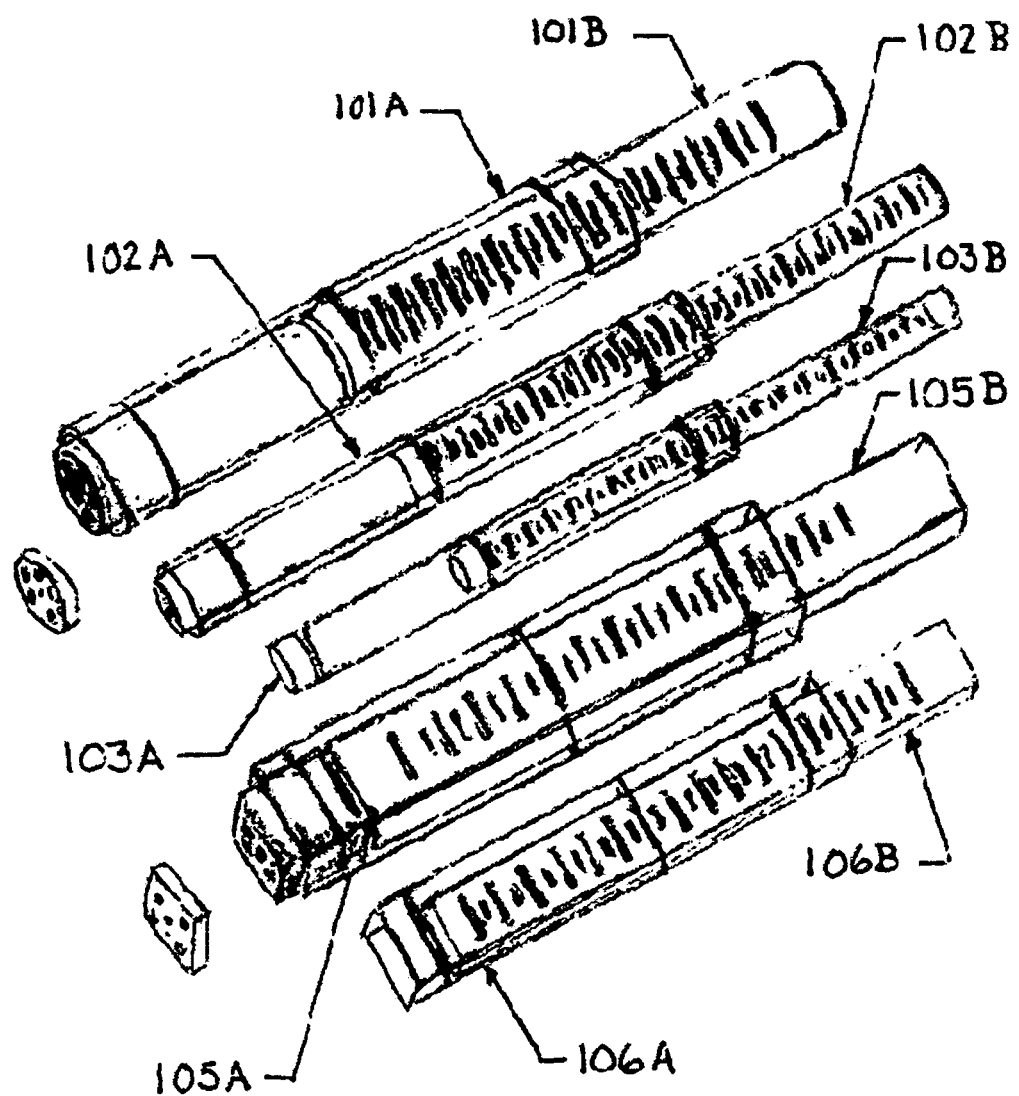

The picture in FIG. 11 shows Polymer Cane Extruder in five different sizes: Large round Polymer Cane Extruder comprises of the tube 101A and rod 101 B together in assembly; medium round Polymer Cane Extruder tube 102 A and rod 102 B together in assembly; small round Polymer Cane Extruder tube 103 A and rod 103 B together in assembly; large square Polymer Cane Extruder tube 105 A and rod 105 B together in assembly; and small square Polymer Cane Extruder tube 106 A and rod 106 B together in assembly

DETAILED DESCRIPTION OF THE INVENTION

Various aspects of the illustrative embodiments will be described using the terms commonly employed by those skilled in the art to convey the substance of their work to others skilled in the art. However, it will be apparent to those skilled in the art that the present invention may be practiced with only some of the described aspects. For purposes of explanation, specific numbers, materials, and configurations are set forth in order to provide a thorough understanding of the illustrative embodiments. However, it will be apparent to one skilled in the art that the present invention may be practiced without the specific details. In other instances, well-known features are omitted or simplified in order to not obscure the illustrative embodiments.

Referring to the drawings, specifically to FIG. 1 of the drawings thereto is showing a hollow polymer "cane" extruder tube with a circular shape head 1 made of clear acrylic for providing a structure for cutting polymer cane slices of various uniform and circular shapes.

Referring to the drawings, specifically to FIG. 2 of the drawings (thereto) is showing a circular shape polymer cane extruder rod top view 2 with a circular shape.

Referring to the drawings, specifically to FIG. 3 of the drawings thereto is showing the measurements on tube and rod of the polymer "cane" extruder with a circular shape head 1 and 2 made of clear acrylic for providing a structure for cutting polymer cane slices of various uniform and circular shapes. The hollow tubing measuring 4" in length and solid acrylic rods measuring 6" in length. The thickness of the tube wall is 1/16".

Referring to the drawings, specifically to FIG. 4 of the drawings thereto is showing the hollow polymer tube top view "cane" extruder with a square shape head 3 made of clear acrylic for providing a structure for cutting polymer cane slices of various uniform square shapes.

Referring to the drawings, specifically to FIG. 5 of the drawings thereto is showing a square shape polymer cane extruder rod top view 4 with a square shape head.

Referring to the drawings, specifically to FIG. 6 of the drawings thereto is showing the measurements on the hollow tube and rod of the polymer "cane" extruder with a square shape head 3 and 4 made of clear acrylic for providing a structure for cutting polymer clay slices of various uniform and square shapes. The hollow tubing measuring 4" in length and solid acrylic rod measuring 6" in length. The thickness of the tube wall is 1/8."

Referring to the drawings, specifically to FIG. 7 of the drawings thereto is showing a hollow polymer "cane" extruder with a triangular shape head 5 from the top view made of clear acrylic for providing a structure for cutting polymer clay slices of various uniform and triangular shapes.

Referring to the drawings, specifically to FIG. 8 of the drawings thereto is showing a triangular shape polymer cane extruder rod top view 6 with a triangular shape head.

Referring to the drawings, specifically to FIG. 9 of the drawings thereto is showing the measurements on the hollow tube and rod of the polymer "cane" extruder with a triangular shape head 5 and 6 made of clear acrylic for providing a structure for cutting polymer clay slices of various uniform and triangular shapes. The hollow tube measures 4" in length and solid acrylic rod measures 6" in length. The thickness of the tube wall is 1/16"

Figure 10:
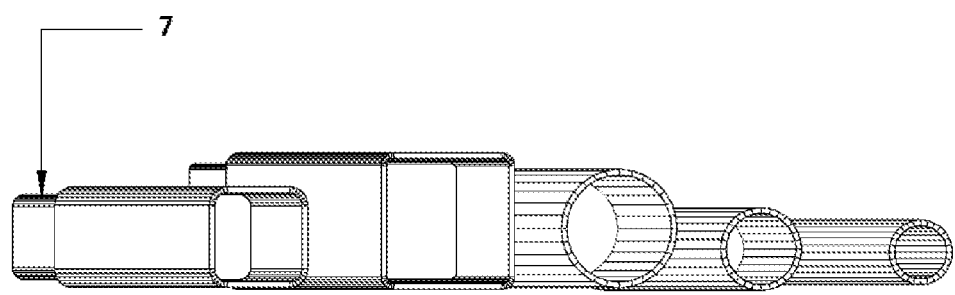
FIG. 10 illustrates the prospective view of various sizes and shapes of polymer cane extruders in the invention.

Referring to the drawings, specifically to FIG. 10 of the drawing thereto is showing the polymer "cane" extruders together with acrylic rod 7 for pushing the polymer canes to be cut in various several shapes and sizes like small, medium and large.

The polymer "cane" extruder 1 and 2 in cylinder style is comprised of a hollow tube and a solid rod, which are represented side by side in FIG. 3. The cylindrical shaped solid rod shown to the right in FIG. 3 is 6 inches in length with etched or marked measuring lines in the 4 inch area. The clear hollow tube is made up of acrylic. It measures 4 inches in length and 1/16 inches in wall thickness and is shown to the left in FIG. 3. Shown below are Tables I, II and III illustrating the different dimensions of the polymer clay "cane" extruder that embodies the principles and concepts of the present invention are described.

In some preferred embodiments, the present invention provides a useful polymer "cane" extruder tool 1 that specifically designed for polymer clay artists to cut uniform slices of their polymer canes. These polymer cane slices can be combined to create "sheets" to make jewelry and/or other arts and crafts related projects. This tool gives uniform shape and size to each slice of polymer cane, which also holds the canes shape and aids in cutting uniform slices of the clay "canes" with little to no distortion. The purpose of the invention is to provide a comfortable usage of the tool by extruding the clay with ease.

The table lists the dimensions of the different polymer cane extruders and the various sizes and shapes. The tables below are Tables 1, 2 and 3 illustrating the different dimensions of the polymer "cane" extruders that embodies the principles and concepts of the present invention is described herein:

Instruction for Cutting Polymer Clay "Canes":
1. Mark the cane evenly with the cut marks—this step is optional.
2. Spray the inside of the cane extruder with a water mist.
3. Insert the reduced polymer clay into cane extruder. The acrylic rod 7 is used to tap the cane evenly so that it fits snugly in the extruder. The same rod is also used to push—extrude the clay out of the cane extruder to the desired thickness.
4. With the end of the cane extruder, a sharp blade is used to cut the polymer clay in to cane slices. Furthermore, the cane should fit snugly when tapped down so that the clay holds its shape in the extruder.

Clean Up: Remove the unused cane to prevent it from sticking inside of the extruder. Clean the tool with a baby wipe or soft cloth with rubbing alcohol. The polymer clay "cane" extruder is water resistant and cleans up with mild soap and water without causing any damage to the product.

Another embodiment discloses the usage of polymer clay canes in jewelry articles, such as beads, pendants, bracelets, and neckpieces. With some particular treatments, polymer-clay composites can also be used to make items with similar appearance of granite, jade, amber, coral, turquoise, and ivory. The polymer-clay composite is also useful in craftsmanship for the manufacturing of wooden boxes, picture frames, mirrors, tableware, small sculptures, and buttons.

With respect to the above description, it is to be understood that the optimum dimensional relationships for the parts of the invention, to include variations in size, materials, shape, form, function and manner of operation, assembly, and use, are deemed readily apparent and obvious to one skilled in the art, and that all equivalent relationships to

TABLE 1

| ITEM# | ITEM DESCRIPTION | OD | ID | ITEM# | ITEM DESCRIPTION | OD | ID |
|---|---|---|---|---|---|---|---|
| 101A | 1.0 TUBE 1/16", wall thickness, tol = +/− (.010) | 1.125 | 1 | 101B | Rod, tol = +.005 | 0.937 | — |
| 102A | 0.75 TUBE 1/16", wall thickness, tol = +/−.010 | .875 | 0.75 | 101B | Rod, tol = +.005 | 0.6875 | — |
| 103A | 0.50 TUBE 1/16", wall thickness, tol = +/−.010 | .625 | 0.5 | 101B | Rod, tol = +.005 | 0.4375 | — |
| 104A | 0.375 TUBE 1/16", wall thickness, tol = +/−.010 | .500 | 0.375 | 101B | Rod, tol = +.005 | 0.25 | — |
|  |  | OUTSIDE | INSIDE |  |  |  |  |
| 105A | 1.5 SQ TUBE 1/8, wall thickness, tol = +/−.030 | 1.75 | 1.5 | 101B | solid, tol = +.005 | — | — |
| 106A | 0.87 SQ TUBE 1/8, wall thickness, tol = +/−.031 | 1.125 | 0.875 | 101B | solid, tol = +.005 | — | — |
| 107A | 0.62 SQ TUBE 1/8, wall thickness, tol = +/−.031 | 0.875 | 0.625 | 101B | solid, tol = +.005 | — | — |
| 108A | 0.37 SQ TUBE 1/8, wall thickness, tol = +/−.030 | 0.625 | 0.375 | 101B | solid, tol = +.005 | — | — |
| 109A | 1.0 Triangular 1/8, wall thickness, tol = +/−.030 | 1.25 | 1 | 101B | Solid triangle, tol = +.005 | — | — |

TABLE 2

| ITEM# | ITEM DESCRIPTION | OD | ID | ITEM# | ITEM DESCRIPTION | OD | ID |
|---|---|---|---|---|---|---|---|
| 109A | 1.0 Triangular 1/16", wall thickness, tol = +/−.030 | 1.25 | 1 | 101B | Solid triangle, tol = +.005 | — | — |

| ASSEMBLY # | DETAILED ITEMS #S |
|---|---|
| 101C= | 101A + 101 |
| 102C= | 102 A + 102B |
| 103C= | 103 A + 103B |
| 104C= | 104 A + 104B |
| 105C= | 105 A + 105B |
| 106C= | 106 A + 106B |
| 107C= | 107 A + 107B |
| 108C= | 108 A + 108B |
| 109C= | 109 A + 109B |

The invention also discloses the process for making polymer, cane (sheets) which is elaborated as:

Preparation: First of all, the process begins by reducing the cane to fit easily in the polymer cane extruder. The cane should be pliable from resizing to provide the best result. Once the preparation of polymer clay is done, the process is further preceded by the cutting of canes.

We claim:

1. A process of producing patterned polymer cane sheets using a handheld polymer clay extruder:
   wherein the handheld polymer clay extruder includes:
   an hollow outer tube and an inner solid rod, the inner solid rod configured to be seated inside said hollow tube and is manually rotatable and movable within the hollow outer tube and is configured to hold a solid polymer clay cane that is pre-shaped into a shape of log, which is of at least one of a square, round, and triangular shapes;
   wherein the solid inner rod is sized six inches in length and has marked or etched measuring lines;
   wherein the hollow outer tube sized four inch in length and from one sixteenth of an inch to one eighth of an inch thick and has marked or etched measuring lines;
   wherein the hollow outer tube and solid inner rod is made of clear acrylic polymer;
   wherein the said configuration of the hollow outer tube and inner solid rod are variable such as each maybe dimensioned to have each accompanying inner solid rods to match their shape and size to fit the inner diameter of said hollow outer tubes and the easy fit dimension of the hollow outer tube and inner solid rod provide easy sliding movement of the solid polymer clay cane, while allowing for the solid polymer clay cane to be pushed out—as solid extruded log without damaging the log during the cutting process of the log into thin smaller slices;
   the process comprising:
   first step of lightly spraying inside the hollow outer tube with water as a release agent; and
   second step, while holding the said hollow outer tube vertically, insert the solid polymer clay cane into the hollow tube and then add the solid inner rod, and thereafter with a tapping down motion, push down the polymer clay cane inside of said hollow outer tube using the solid inner rod on a cutting surface so as to compress the cane slightly and to fill the hollow outer tube snugly while still allowing the solid polymer clay cane to move freely along with ease within the hollow outer tube;
   and firmly holding down on the hollow outer tube and solid inner rod horizontally on the work surface with the less dominate hand, and using a thin cutting blade with the dominant hand, use the edge of the hollow outer tube as a cutting guide, slide a cutting blade across the edge of hollow outer tube and cut off a thin slice of the solid polymer cane.

2. The process of producing patterned polymer cane sheets using the handheld polymer clay extruder as claimed in claim 1, further comprising third step, right before the cutting, including holding the said hollow outer tube and solid inner rod firmly down horizontally on the cutting surface using the less dominate hand while simultaneously and gently pushing the inner solid rod slightly to extrude-push out the solid polymer cane to a desired length; wherein the marked or etched measuring lines on said hollow outer tube and solid inner tube are used as a visual aid while extruding desired amount of the solid polymer cane, when extruded desired amount of the solid polymer cane is reached, pushing is stopped on the inner solid rod.

3. The process of producing patterned polymer cane sheets using the handheld polymer clay extruder as claimed in claim 2, further comprising: repeating the process cutting off a plurality of pieces of thin slices of the solid polymer cane equally and uniformly in size and placing them side by side, such that arranging them up against one another; and thereafter a step of placing them on a dry and clean work surface and squaring them up with the edge of a blade.

4. The process of producing patterned polymer cane sheets using the handheld polymer clay extruder as claimed in claim 3, further comprising: after a desired quantity or pieces are cut off the solid polymer cane arranged side by side on the work surface, a step smoothing the plurality of pieces using the inner solid rod and making the pieces of thin slices unite into one continuous multi-patterned sheet of polymer clay.

5. The process of producing patterned polymer cane sheet using the handheld polymer clay extruder as claimed in claim 4, after the smoothing step, the newly formed multi-patterned sheet of polymer optionally being sandwiched or overlay by adding it on top of a separate rolled out sheet of polymer clay; and a step of using the inner solid rod, for second time smooth-rolling over the surface of the multi-patterned sheet that is on the separate rolled out sheet of the polymer clay to adhere them together to form a final sandwiched piece; and after the sandwiched piece is smoothed out, optionally a second cutting step using a separate cutting tool to any desired length or shape in which an artist or novice prefer; and then final step of a curing the final sandwiched piece.

* * * * *